United States Patent
Tsukihara et al.

(10) Patent No.: US 11,440,108 B2
(45) Date of Patent: Sep. 13, 2022

(54) ROTARY CUTTING TOOL

(71) Applicant: SUMITOMO ELECTRIC HARDMETAL CORP., Itami (JP)

(72) Inventors: Nozomi Tsukihara, Itami (JP); Yutaka Kobayashi, Itami (JP); Minoru Yoshida, Itami (JP)

(73) Assignee: SUMITOMO ELECTRIC HARDMETAL CORP., Itami (JP)

(*) Notice: Subject to any disclaimer, the term of this patent is extended or adjusted under 35 U.S.C. 154(b) by 275 days.

(21) Appl. No.: 16/644,813

(22) PCT Filed: Sep. 7, 2017

(86) PCT No.: PCT/JP2017/032221
§ 371 (c)(1),
(2) Date: Mar. 5, 2020

(87) PCT Pub. No.: WO2019/049252
PCT Pub. Date: Mar. 14, 2019

(65) Prior Publication Data
US 2020/0391305 A1    Dec. 17, 2020

(51) Int. Cl.
*B23C 5/10* (2006.01)
*C23C 28/04* (2006.01)
(Continued)

(52) U.S. Cl.
CPC ............. *B23C 5/10* (2013.01); *C23C 28/044* (2013.01); *C23C 28/046* (2013.01); *C23C 30/00* (2013.01);
(Continued)

(58) Field of Classification Search
CPC .............. B23B 51/02; B23B 2226/315; B23B 2228/10; B23B 2251/204; C23C 28/046;
(Continued)

(56) References Cited

U.S. PATENT DOCUMENTS

| 4,227,837 A | 10/1980 | Yodoshi |
| 4,990,035 A | 2/1991 | Scheuch et al. |

(Continued)

FOREIGN PATENT DOCUMENTS

| CH | 701414 A1 | 1/2011 |
| CN | 102257176 A | 11/2011 |

(Continued)

OTHER PUBLICATIONS

Deuerler et al., "Pretreatment of substrate surface for improved adhesion of diamond films on hard metal cutting tools", Diamond and Related Materials, May (1996), pp. 1478-1489.

*Primary Examiner* — Eric A. Gates
*Assistant Examiner* — Paul M Janeski
(74) *Attorney, Agent, or Firm* — Faegre Drinker Biddle & Reath LLP (57) ABSTRACT

A rotary cutting tool includes a main body and a shank. The main body has a tip end. The shank is continuous with the main body on the side opposite to the tip end. The main body is provided with a first cutting edge having a positive twist angle, and a second cutting edge having a negative twist angle and separated from the first cutting edge. Each of the first cutting edge and the second cutting edge extends continuously from the tip end to the shank.

8 Claims, 6 Drawing Sheets

(51) Int. Cl.
*C23C 30/00* (2006.01)
*B23B 51/02* (2006.01)

(52) U.S. Cl.
CPC ......... *B23B 51/02* (2013.01); *B23B 2226/315* (2013.01); *B23B 2228/10* (2013.01); *B23B 2251/204* (2013.01); *B23C 2210/0492* (2013.01); *B23C 2226/27* (2013.01); *B23C 2226/315* (2013.01); *B23C 2228/10* (2013.01)

(58) Field of Classification Search
CPC .................. C23C 28/044; C23C 30/00; C23C 2210/0492; C23C 2226/27; C23C 2226/315; C23C 2228/10; C23C 5/10
See application file for complete search history.

(56) References Cited

U.S. PATENT DOCUMENTS

| | | | |
|---|---|---|---|
| 5,011,514 A * | 4/1991 | Cho | E21B 10/567 51/293 |
| 9,079,260 B2 * | 7/2015 | Xiao | B23D 77/02 |
| 2007/0104953 A1 * | 5/2007 | Sugita | C23C 14/027 428/408 |
| 2008/0019787 A1 * | 1/2008 | Sampath | B23B 51/02 408/230 |
| 2010/0196108 A1 | 8/2010 | Oka et al. | |
| 2011/0250394 A1 | 10/2011 | Yoshida et al. | |

FOREIGN PATENT DOCUMENTS

| | | | |
|---|---|---|---|
| CN | 105422014 A | | 3/2016 |
| EP | 0559961 A1 | | 9/1993 |
| JP | S54-119198 A | | 9/1979 |
| JP | 60177807 A | * | 9/1985 |
| JP | H05-253757 A | | 10/1993 |
| JP | H6-346241 A | | 12/1994 |
| JP | 2010-234462 A | | 10/2010 |
| JP | 2011-104721 A | | 6/2011 |
| JP | 2015-193913 A | | 11/2015 |
| JP | 105216021 A | | 1/2016 |
| WO | WO-2009/122937 A1 | | 10/2009 |

* cited by examiner

ROTARY CUTTING TOOL

TECHNICAL FIELD

The present invention relates to a rotary cutting tool.

BACKGROUND ART

Japanese Patent Laying-Open No. 54-119198 (PTL 1) describes a router tool having cutting edges twisting in different directions. In the router tool described in Japanese Patent Laying-Open No. 54-119198, each cutting edge is divided into a plurality of cutting edge parts at the effective cutting length region.

CITATION LIST

Patent Literature

PTL 1: Japanese Patent Laying-Open No. 54-119198

SUMMARY OF INVENTION

A rotary cutting tool according to one aspect of the present invention includes a main body and a shank. The main body has a tip end. The shank is continuous with the main body on the side opposite to the tip end. The main body is provided with a first cutting edge having a positive twist angle, and a second cutting edge having a negative twist angle and separated from the first cutting edge. Each of the first cutting edge and the second cutting edge extends continuously from the tip end to the shank.

DETAILED DESCRIPTION

Problem to be Solved by the Present Disclosure

If each cutting edge is divided into a plurality of cutting edge parts at the effective cutting length region, each of the plurality of cutting edge parts intermittently bites into a workpiece during cutting work. This causes a high cutting resistance, making it difficult to satisfactorily suppress the occurrence of burr on the workpiece.

An object of one aspect of the present invention is to suppress the occurrence of burr on a workpiece.

Advantageous Effect of the Present Disclosure

One aspect of the present invention can suppress the occurrence of burr on a workpiece.

Summary of Embodiments of the Present Disclosure

First, embodiments of the present disclosure are overviewed.

(1) A rotary cutting tool 1 according to one aspect of the present invention includes a main body 3 and a shank 2. Main body 3 has a tip end 7. Shank 2 is continuous with main body 3 on the side opposite to tip end 7. Main body 3 is provided with a first cutting edge 11 having a positive twist angle, and a second cutting edge 21 having a negative twist angle and separated from first cutting edge 11. Each of first cutting edge 11 and second cutting edge 21 extends continuously from tip end 7 to shank 2.

In rotary cutting tool 1 according to the above (1), each of first cutting edge 11 and second cutting edge 21 extends continuously from tip end 7 to shank 2. Thus, rotary cutting tool 1 according to the above (1) can smoothly progress with cutting without intermittent bites, as compared with a cutting tool in which each of first cutting edge 11 and second cutting edge 21 lies intermittently. As a result, the cutting resistance is reduced, thus suppressing the occurrence of burr on a workpiece.

(2) In rotary cutting tool 1 according to the above (1), core thickness D2 of main body 3 may be not less than 0.4 times and not more than 0.9 times as large as diameter D1 of main body 3. Rotary cutting tool 1 according to the present embodiment, which has a reduced cutting resistance as mentioned above, allows a reduced core thickness D2 of main body 3 with a low risk of breakage of main body 3. The reduced core thickness D2 allows deep grooves to be formed in main body 3. As a result, the chip discharging efficiency is improved. Further, deepening the grooves leads to an increased surface area of the grooves. As a result, the heat dissipation of main body 3 is improved. This can suppress a temperature rise of main body 3, thus preventing a low-melting-point workpiece (e.g., resin) from melting.

(3) In rotary cutting tool 1 according to the above (1) or (2), main body 3 may include a base material 4, and a coating 5 covering base material 4. Coating 5 may include at least one of a diamond and a diamond-like carbon. In this case, each of first cutting edge 11 and second cutting edge 21 has an improved wear resistance or slidability. As a result, the life of rotary cutting tool 1 is prolonged. Also, the deterioration in sharpness of each of first cutting edge 11 and second cutting edge 21 can be suppressed, allowing an excellent surface texture of the cutting face of a workpiece. Further, each of first cutting edge 11 and second cutting edge 21 is improved in sharpness, which in turn allows further reduction in core thickness D2 with a low risk of breakage of main body 3. Therefore, core thickness D2 can be further reduced, so that the chip discharging efficiency can be further improved. The heat dissipation of main body 3 can also be further improved.

(4) In rotary cutting tool 1 according to the above (3), coating 5 may be a diamond. In this case, each of first cutting edge 11 and second cutting edge 21 has an improved wear resistance. As a result, the deterioration in sharpness of each of first cutting edge 11 and second cutting edge 21 can be suppressed, thus allowing an excellent surface texture of the cutting face of a workpiece.

(5) In rotary cutting tool 1 according to the above (4), coating 5 may have a thicknesses of not less than 6 μm and not more than 20 μm.

(6) In rotary cutting tool 1 according to the above (5), the diamond may be a monocrystalline diamond or a polycrystalline diamond.

(7) In rotary cutting tool 1 according to the above (6), the diamond may be a polycrystalline diamond. The polycrystalline diamond may have a superficial layer 5a having a mean grain diameter of not less than 0.1 μm and not more than 5 μm.

(8) In rotary cutting tool 1 according to the above (3), coating 5 may be a diamond-like carbon. In this case, each of first cutting edge 11 and second cutting edge 21 has an improved slidability. As a result, the deterioration in sharpness of each of first cutting edge 11 and second cutting edge 21 can be suppressed, thus allowing an excellent surface texture of the cutting face of a workpiece.

(9) In rotary cutting tool 1 according to the above (8), coating 5 may have a thicknesses of not less than 0.2 μm and not more than 2 μm.

(10) In rotary cutting tool 1 according to any one of the above (3) to (9), base material 4 may have a surface roughness of not less than 0.2 μm and not more than 2.0 μm. In this case, the adhesion between coating 5 and base material 4 is improved.

(11) In rotary cutting tool 1 according to any one of the above (3) to (10), coating 5 may include at least one element selected from the group consisting of iron, molybdenum, and tungsten. Each of iron, molybdenum, and tungsten reacts with carbon to produce carbide, thus further improving the adhesion between coating 5 and base material 4.

(12) In rotary cutting tool 1 according to the above (11), in a portion of coating 5 that is in contact with base material 4, the total content of the at least one element may be not less than $1.0 \times 10^{15}$ atoms/cm$^3$ and not more than $1.0 \times 10^{18}$ atoms/cm$^3$.

(13) In rotary cutting tool 1 according to any one of the above (1) to (12), at tip end 7, the phase angle from first cutting edge 11 to second cutting edge 21 in the circumferential direction may be different from the phase angle from second cutting edge 21 to first cutting edge 11 in the circumferential direction. Since first cutting edge 11 and second cutting edge 21 twist in different directions, the axial cutting forces from these cutting edges cancel each other out. First cutting edge 11 and second cutting edge 21 also differ in cutting cycle. Thus, the occurrence of chattering during work is suppressed.

(14) In rotary cutting tool 1 according to any one of the above (1) to (13), each of the positive twist angle and the negative twist angle may have an absolute value of not less than 3° and not more than 10°.

Details of Embodiments of the Disclosure

The details of embodiments of the present disclosure will now be described with reference to the drawings. In the following description, the same or corresponding elements are denoted by the same reference signs, and the redundant description of them is not repeated.

First, the configuration of rotary cutting tool 1 according to the present embodiment is described.

Figure 1:
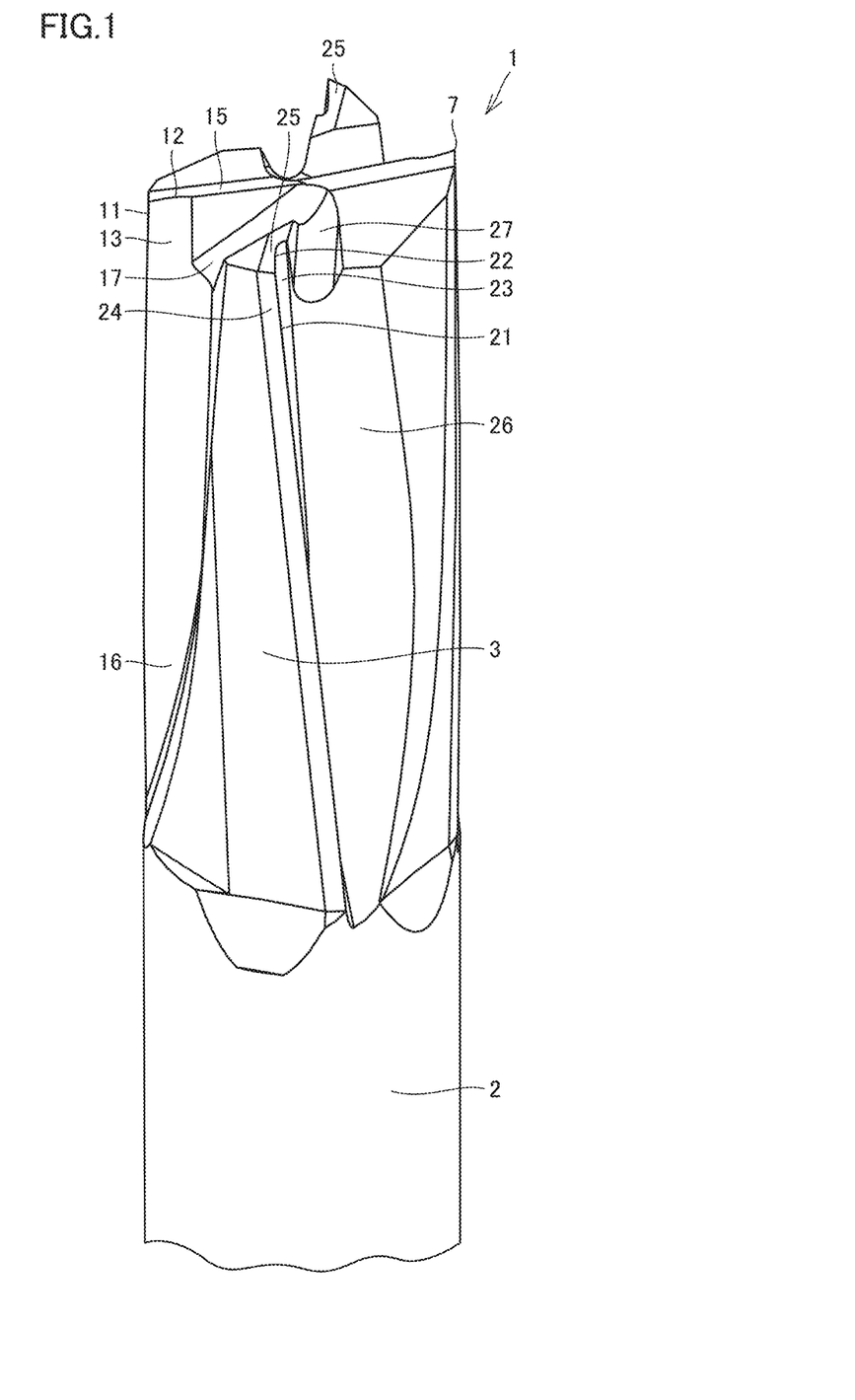
FIG. 1 is a schematic perspective view showing a configuration of a rotary cutting tool according to the present embodiment.
Figure 2:
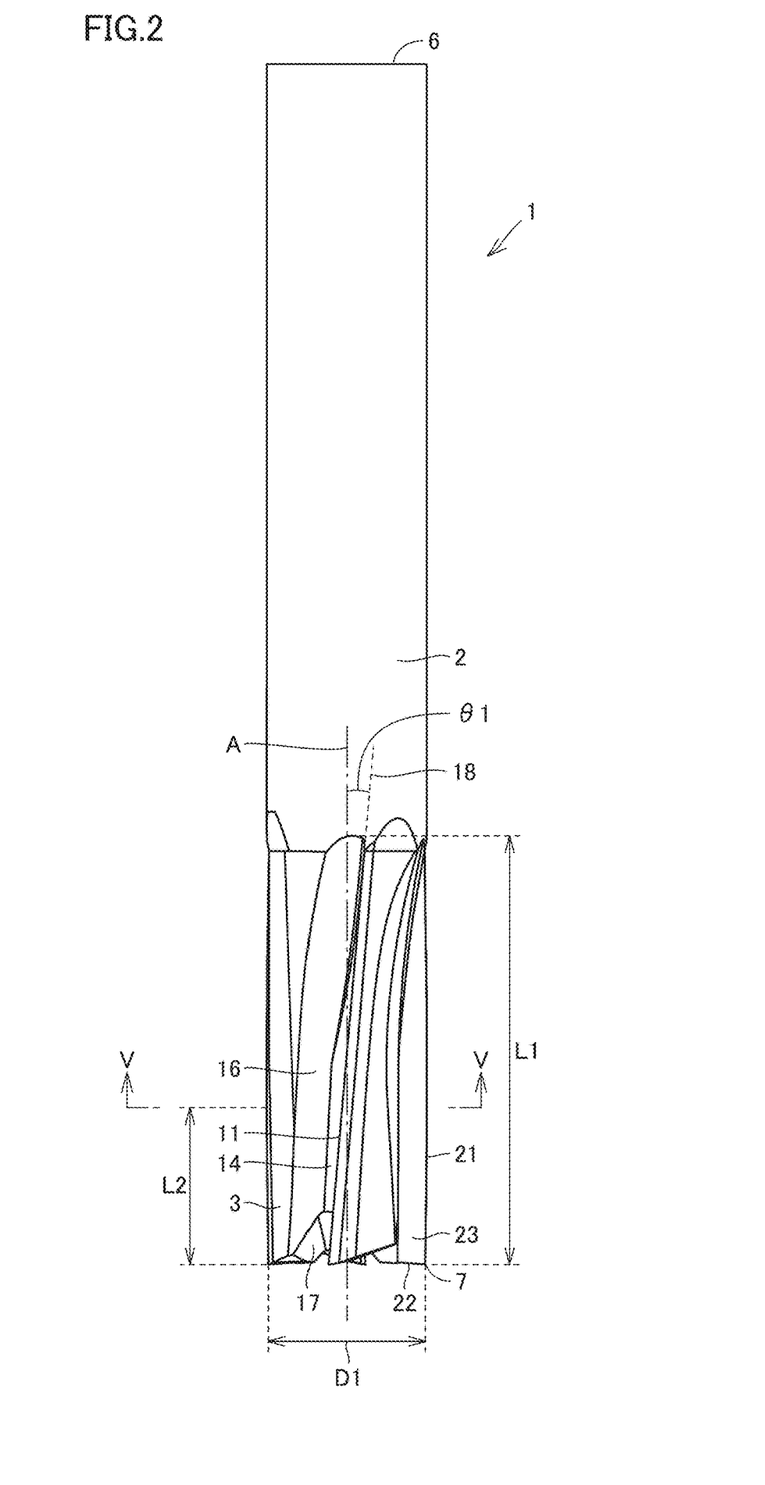
FIG. 2 is a first schematic side view of a rotary cutting tool according to the present embodiment, as seen from a direction perpendicular to its rotation axis.
Figure 3:
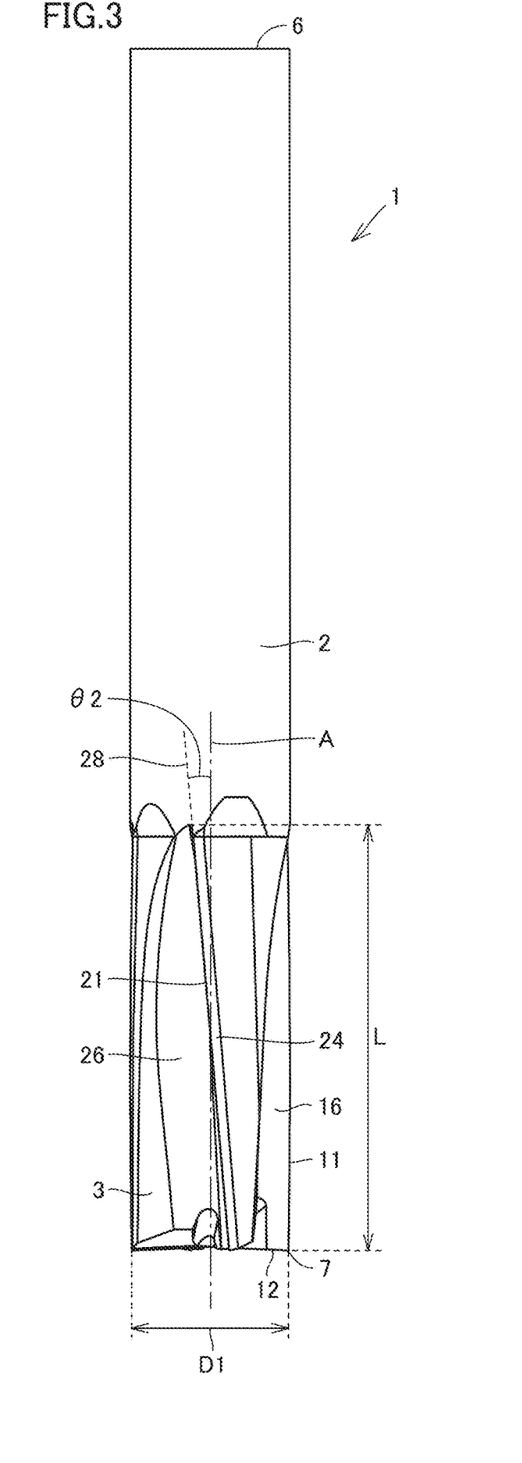
FIG. 3 is a second schematic side view of a rotary cutting tool according to the present embodiment, as seen from a direction perpendicular to its rotation axis.

As shown in FIGS. 1, 2 and 3, rotary cutting tool 1 according to the present embodiment is, for example, an end mill for cutting a fiber reinforced resin, such as a carbon fiber reinforced plastic (CFRP), and mainly includes main body 3 and shank 2. Rotary cutting tool 1 is rotatable around rotation axis A (see FIG. 2). Main body 3 has tip end 7. Shank 2 is continuous with main body 3 on the side opposite to tip end 7. Shank 2 has a base end 6. Shank 2 is a portion that is attached to the main shaft of, for example, a milling machine. Main body 3 has, for example, a first rake face 13, a first bottom face 15, a first flank face 14, a second rake face 23, a second bottom face 25, and a second flank face 24. First rake face 13 is continuous with each of first bottom face 15 and first flank face 14. Second rake face 23 is continuous with each of second bottom face 25 and second flank face 24. The ridgeline defined by first rake face 13 and first flank face 14 constitutes first cutting edge 11. The ridgeline defined by first rake face 13 and first bottom face 15 constitutes first bottom edge 12. The ridgeline defined by second rake face 23 and second flank face 24 constitutes second cutting edge 21. The ridgeline defined by second rake face 23 and second bottom face 25 constitutes second bottom edge 22.

Main body 3 is provided with first cutting edge 11 and second cutting edge 21. Each of first cutting edge 11 and second cutting edge 21 is a peripheral cutting edge provided at the periphery of main body 3. First cutting edges 11 and second cutting edges 21 are alternately provided at intervals in the circumferential direction. Each of first cutting edge 11 and second cutting edge 21 helically extends around rotation axis A. Second cutting edge 21 is separated from first cutting edge 11. First cutting edge 11 does not cross second cutting edge 21. First cutting edge 11 has a positive twist angle. Second cutting edge 21 has a negative twist angle. Stated another way, first cutting edge 11 and second cutting edge 21 twist in different directions. If first cutting edge 11 twists right, then second cutting edge 21 twists left. On the other hand, if first cutting edge 11 twists left, then second cutting edge 21 twists right.

The number of first cutting edges 11 is, but is not limited to, 2 or more, for example. The number of second cutting edges 21 is, but is not limited to, 2 or more, for example. Main body 3 may be provided with first bottom edge 12 and second bottom edge 22. First bottom edge 12 may be continuous with first cutting edge 11. Second bottom edge 22 may be continuous with second cutting edge 21. First bottom edges 12 and second bottom edges 22 are alternately provided in the circumferential direction. The number of first bottom edges 12 is, but is not limited to, 2 or more, for example. The number of second bottom edges 22 is, but is not limited to, 2 or more, for example. Main body 3 may have a first groove 16, a second groove 26, a third groove 17, and a fourth groove 27. First groove 16 is located on the base end side relative to third groove 17. Second groove 26 is located on the base end side relative to fourth groove 27. First groove 16 is continuous with first rake face 13. Second groove 26 is continuous with second rake face 23. Shank 2 does not have a cutting edge that is continuous with first cutting edge 11 or second cutting edge 11.

As shown in FIG. 2, as seen from a direction perpendicular to rotation axis A, straight line 18 along the direction in which first cutting edge 11 extends inclines at positive twist angle θ1 with respect to rotation axis A. Positive twist angle θ1 is, for example, not less than 3° and not more than 10°. Positive twist angle θ1 is a clockwise inclination angle with respect to rotation axis A in a side view in FIG. 2. In the view of base end 6 from tip end 7, first cutting edge 11 twists clockwise. As shown in FIG. 3, as seen from a direction perpendicular to rotation axis A, straight line 28 along the direction in which second cutting edge 21 extends inclines at negative twist angle θ2 with respect to rotation axis A. Negative twist angle θ2 is a counterclockwise inclination angle with respect to rotation axis A in a side view in FIG. 3. In the view of base end 6 from tip end 7, second cutting edge 21 twists counterclockwise. Negative twist angle θ2 is, for example, not less than −10° and not more than −3°. That is, each of the positive twist angle and the negative twist angle has an absolute value of not less than 3° and not more than 10°, for example. Positive twist angle θ1 and negative twist angle θ2 may have about the same absolute value. Specifically, the absolute value of the difference between the absolute value of positive twist angle θ1 and the absolute value of negative twist angle θ2 may be, for example, 0.5° or less.

Each of first cutting edge 11 and second cutting edge 21 extends continuously from tip end 7 to shank 2. Stated another way, each of first cutting edge 11 and second cutting edge 21 extends continuously from one end of main body 3 to the other end (i.e., to the boundary between main body 3 and shank 2) in the axial direction. Stated still another way, each of first cutting edge 11 and second cutting edge 21 lies continuously over the effective cutting length. In other words, each of first cutting edge 11 and second cutting edge 21 is not divided in the middle. Tip end 7 of rotary cutting tool 1 is the tip end of the periphery of main body 3 in the direction along rotation axis A.

Figure 4:
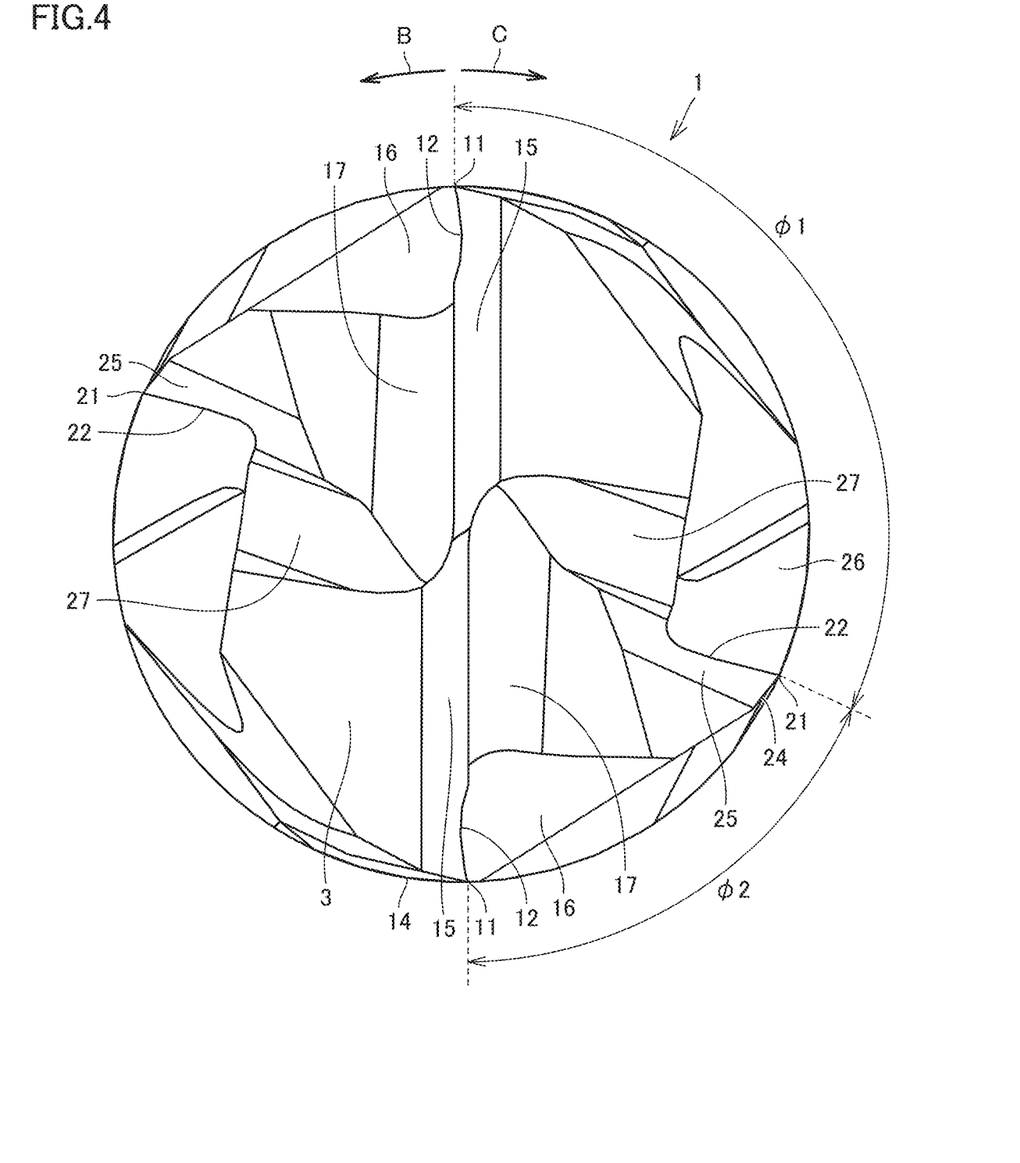
FIG. 4 is a schematic front view of a rotary cutting tool according to the present embodiment, as seen from the direction parallel to its rotation axis.

In FIG. 4, first circumferential direction B and second circumferential direction C are respectively the rotationally forward and backward directions. As shown in FIG. 4, at tip end 7 of rotary cutting tool 1, phase angle φ1 from first cutting edge 11 to second cutting edge 21 in second circumferential direction C may be different from phase angle φ2 from second cutting edge 21 to first cutting edge 11 in second circumferential direction C. Specifically, at tip end 7 of rotary cutting tool 1, phase angle φ1 from first cutting edge 11 to second cutting edge 21 located in the rotationally backward direction may be different from phase angle φ2 from second cutting edge 21 to first cutting edge 11 located in the rotationally backward direction. Phase angle φ1 is, for example, larger than phase angle φ2. Instead, phase angle φ1 may be smaller than phase angle φ2. The rotationally backward direction is the direction opposite to the rotationally forward direction. First cutting edge 11 may be continuous with first bottom edge 12 at tip end 7. Also, second cutting edge 21 may be continuous with second bottom edge 22 at tip end 7.

Figure 5:
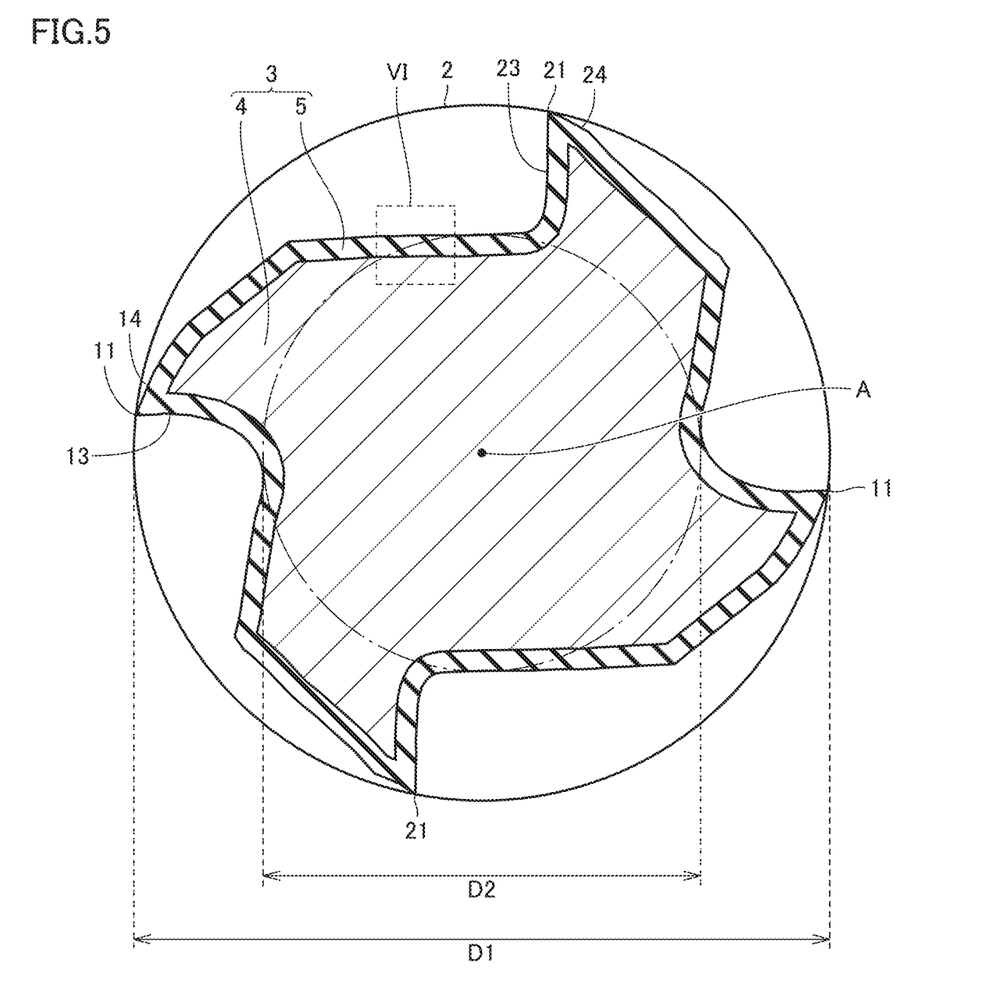
FIG. 5 is a schematic cross-sectional view of a rotary cutting tool according to the present embodiment, as seen from the direction along line V-V in FIG. 2.

As shown in FIG. 5, core thickness D2 of main body 3 is the diameter of the incircle of main body 3 in cross section of main body 3 perpendicular to rotation axis A. In the present embodiment, core thickness D2 of main body 3 is, for example, not less than 0.4 times and not more than 0.9 times as large as diameter D1 of main body 3. Core thickness D2 of main body 3 may be, for example, 0.5 times or more, or 0.6 times or more, as large as diameter D1 of main body 3. Core thickness D2 of main body 3 may be, for example, 0.8 times or less, or 0.7 or less, as large as diameter D1 of main body 3.

As shown in FIG. 5, main body 3 includes, for example, a base material 4 and a coating 5. Coating 5 covers base material 4. The material of base material 4 is, for example, a cemented carbide that contains powdery tungsten carbide (WC) and a binder (e.g., cobalt (Co)). However, base material 4 is not limited to a cemented carbide, but may be, for example, a polycrystalline diamond, a cermet, or a ceramic. Coating 5 includes, for example, at least one of a diamond and a diamond-like carbon. Coating 5 covers, for example, the whole effective cutting length of main body 3.

If coating 5 is a diamond, thicknesses T of coating 5 (see FIG. 6) is, for example, not less than 6 μm and not more than 20 μm. Thicknesses T of coating 5 may be, for example, 6 μm or more, or 9 μm or more. Thicknesses T of coating 5 may be, for example, 20 μm or less, or 18 μm or less. The structure and thicknesses of coating 5 can be measured by observing a cross section of coating 5 taken along the film growth direction, using a scanning electron microscope (SEM) or a transmission electron microscope (TEM).

The diamond is, for example, a monocrystalline diamond or a polycrystalline diamond. The crystallinity of the diamond can be determined using Raman spectroscopy. Raman spectroscopy can determine the presence of a peak at 1333 cm$^{-1}$, which is a characteristic of diamond, and determine from the half width of spectrum whether the diamond is a monocrystalline diamond or a polycrystalline diamond. If the half width of spectrum is larger than 10 cm$^{-1}$, the diamond is determined to be a polycrystalline diamond. If the half width of spectrum is 10 cm$^{-1}$ or less, the diamond is determined to be a monocrystalline diamond.

Figure 6:
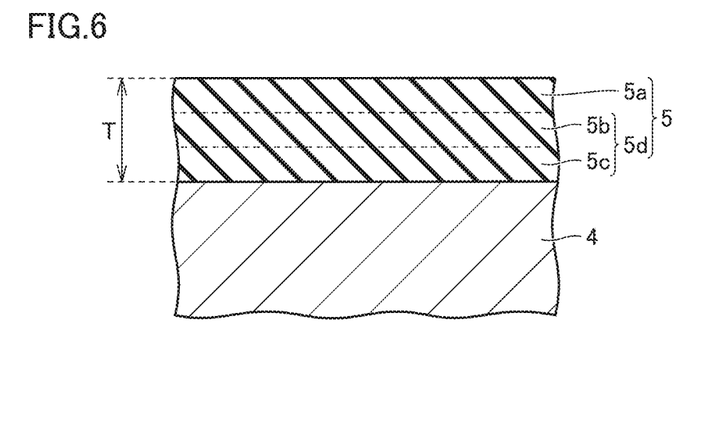
FIG. 6 is a schematic enlarged view of VI region in FIG. 5.

As shown in FIG. 6, a polycrystalline diamond may include a superficial layer 5a and a deep layer 5d. Deep layer 5d is located between superficial layer 5a and base material 4. Superficial layer 5a of the polycrystalline diamond refers to the region 8 μm or less from the surface of the polycrystalline diamond toward base material 4. The mean grain diameter of the crystal grain may be smaller in superficial layer 5a of the polycrystalline diamond than in deep layer 5d (the portion other than superficial layer 5a) of the polycrystalline diamond.

If coating 5 is a polycrystalline diamond, the mean grain diameter in superficial layer 5a of the polycrystalline diamond is, for example, not less than 0.1 μm and not more than 5 μm. The mean grain diameter in superficial layer 5a of the polycrystalline diamond may be, for example, 0.1 μm or more, or 0.5 μm or more. The mean grain diameter in superficial layer 5a of the polycrystalline diamond may be, for example, 3 μm or less, or 2 μm or less. In superficial layer 5a of the polycrystalline diamond, the mean grain diameter of the crystal grain can be measured using a transmission electron microscope (TEM). Specifically, a cross section of coating 5 taken along the film growth direction is observed at not less than 5000-fold magnification and not more than 1000000-fold magnification using a transmission electron microscope. At this time, the magnification is adjusted so that the field of view for observation includes at least 20 crystal grains. Then, the circumcircle-equivalent diameter is measured for 10 crystal grains chosen at random from the field of view for observation. The arithmetic mean value of the measurement values of the circumcircle-equivalent diameters obtained as above, but excluding the maximum and minimum values, is determined to be the "diameter of crystal grain".

If coating 5 is a diamond-like carbon, thicknesses T of coating 5 (see FIG. 6) is, for example, not less than 0.2 μm and not more than 2 μm. Thicknesses T of coating 5 may be, for example, 0.5 μm or more, or 0.7 μm or more. Thicknesses T of coating 5 may be, for example, 1.8 μm or less, or 1.5 μm or less.

The surface roughness of base material 4 is, for example, not less than 0.2 μm and not more than 2.0 μm. The surface roughness is the maximum height roughness (Rz). The surface roughness of base material 4 can be measured by a 3D profilometer (manufactured by Zygo Corporation) using scanning white light interferometry. Specifically, the surface roughness of base material 4 can be determined by removing coating 5 from base material 4 and then measuring the surface of base material 4 by a 3D profilometer.

Coating 5 may contain at least one element selected from the group consisting of iron, molybdenum, and tungsten. Specifically, coating 5 may contain one, two or more, or all of the three types of elements: iron, molybdenum, and tungsten. Coating 5 may contain at least one of an iron carbide, a molybdenum carbide, and a tungsten carbide.

As shown in FIG. 6, deep layer 5d of coating 5 may include a portion 5c of coating 5 that is in contact with base material 4, and an intermediate layer 5b. Portion 5c of coating 5 that is in contact with base material 4 is the portion 3 µm or less from the surface of base material 4. In the portion of coating 5 that is in contact with base material 4, the total content of at least one of the elements may be not less than $1.0 \times 10^{15}$ atoms/cm$^3$ and not more than $1.0 \times 10^{18}$ atoms/cm$^3$. Note that the total content of at least one of the elements refers to the total content of any of the above-described three types of elements (iron, molybdenum, and tungsten). The total content may be, for example, $1.0 \times 10^{15}$ atoms/cm$^3$ or more, or $3.0 \times 10^{15}$ atoms/cm$^3$ or more. The total content may be, for example, $1.0 \times 10^{18}$ atoms/cm$^3$ or less, or $5.0 \times 10^{17}$ atoms/cm$^3$ or less. The content of elements, such as iron, molybdenum, and tungsten, can be measured using secondary ion mass spectrometry (SIMS).

A method for forming a coating of a rotary cutting tool according to the present embodiment will now be described.

First, the surface of base material 4 is etched. Specifically, for example, hydrogen peroxide solution ($H_2O_2$) or hydrochloric acid (HCl) or nitric acid ($HNO_3$) is used to etch the surface of base material 4 made of cemented carbide. Thus, the surface of base material 4 is roughened to increase its surface roughness.

Then, coating 5 is formed on base material 4. If coating 5 is a diamond, coating 5 is formed by, for example, chemical vapor deposition (CVD). If coating 5 is a diamond-like carbon, coating 5 is formed by, for example, physical vapor deposition (PVD). The etching roughens the surface of base material 4, thus increasing the surface area of base material 4. This improves the adhesion between coating 5 and base material 4 when coating 5 is formed on the surface of base material 4. To the surface of base material 4, a metal element (e.g., iron, molybdenum or tungsten) adheres and reacts with carbon to produce carbide. Thus, the adhesion between coating 5 and base material 4 is improved.

A way of work using a rotary cutting tool according to the present embodiment will now be described.

Figure 7:
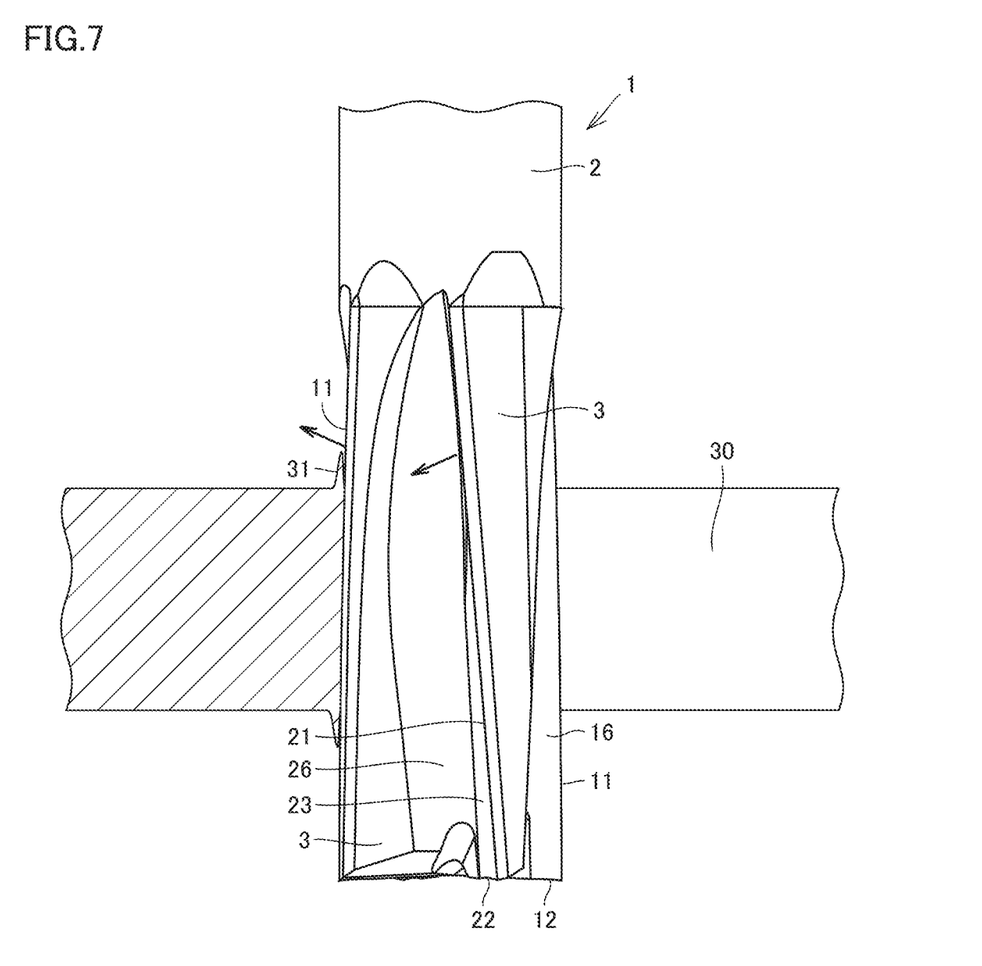
FIG. 7 is a schematic partial cross-sectional view showing a way of work using a rotary cutting tool according to the present embodiment.

As shown in FIG. 7, when rotary cutting tool 1 according to the present embodiment is used to cut a workpiece 30, such as a CFRP, first cutting edge 11 gives an upward cutting force to the upper surface of workpiece 30. Cutting with first cutting edge 11 therefore tends to cause a burr 31 on the upper surface of workpiece 30. On the other hand, second cutting edge 21 twists in the direction opposite to first cutting edge 11. Therefore, second cutting edge 21 gives a downward cutting force to the upper surface of workpiece 30. Cutting with second cutting edge 21 removes burr 31. First cutting edge 11 serves mainly to perform cutting, while second cutting edge 21 removes the burr, thus suppressing the occurrence of burr on workpiece 30.

Although an example where workpiece 30 is a CFRP is described above, workpiece 30 is not limited to a CFRP. Workpiece 30 may be, for example, a glass fiber reinforced plastic (GFRP), a cellulose nanofiber, or a ceramic. Further, although an example where rotary cutting tool 1 is an end mill is described above, rotary cutting tool 1 is not limited to an end mill. Rotary cutting tool 1 may be, for example, a router tool.

The advantageous effects of a cutting tool according to the present embodiment will now be described.

In rotary cutting tool 1 according to the present embodiment, each of first cutting edge 11 and second cutting edge 21 extends continuously from tip end 7 to shank 2. Thus, rotary cutting tool 1 according to the present embodiment can smoothly progress with cutting without intermittent bites, as compared with a cutting tool in which each of first cutting edge 11 and second cutting edge 21 lies intermittently. As a result, the cutting resistance is reduced, thus suppressing the occurrence of burr on a workpiece.

In rotary cutting tool 1 according to the present embodiment, core thickness D2 of main body 3 is not less than 0.4 times and not more than 0.9 times as large as diameter D1 of main body 3. Rotary cutting tool 1 according to the present embodiment, which has a reduced cutting resistance as mentioned above, allows a reduced core thickness D2 of main body 3 with a low risk of breakage of main body 3. The reduced core thickness D2 allows deep grooves to be formed in main body 3. As a result, the chip discharging efficiency is improved. Further, deepening the grooves leads to an increased surface area of the grooves. As a result, the heat dissipation of main body 3 is improved. This can suppress a temperature rise of main body 3, thus preventing a low-melting-point workpiece (e.g., resin) from melting.

Further, in rotary cutting tool 1 according to the present embodiment, main body 3 includes base material 4, and coating 5 covering base material 4. Coating 5 may include at least one of a diamond and a diamond-like carbon. In this case, each of first cutting edge 11 and second cutting edge 21 has an improved wear resistance or slidability. As a result, the life of rotary cutting tool 1 is prolonged. Also, the deterioration in sharpness of each of first cutting edge 11 and second cutting edge 21 can be suppressed, allowing an excellent surface texture of the cutting face of a workpiece. Further, each of first cutting edge 11 and second cutting edge 21 is improved in sharpness, which in turn allows further reduction in core thickness D2 with a low risk of breakage of main body 3. Therefore, core thickness D2 can be further reduced, so that the chip discharging efficiency can be further improved. The heat dissipation of main body 3 can also be further improved.

In rotary cutting tool 1 according to the present embodiment, coating 5 may be a diamond. In this case, each of first cutting edge 11 and second cutting edge 21 has an improved wear resistance. As a result, the deterioration in sharpness of each of first cutting edge 11 and second cutting edge 21 can be suppressed, thus allowing an excellent surface texture of the cutting face of a workpiece.

Further, in rotary cutting tool 1 according to the present embodiment, coating 5 may be a diamond-like carbon. In this case, each of first cutting edge 11 and second cutting edge 21 has an improved slidability. As a result, the deterioration in sharpness of each of first cutting edge 11 and second cutting edge 21 can be suppressed, thus allowing an excellent surface texture of the cutting face of a workpiece.

Further, in rotary cutting tool 1 according to the present embodiment, coating 5 may include at least one element selected from the group consisting of iron, molybdenum, and tungsten. Each of iron, molybdenum, and tungsten reacts with carbon to produce carbide, thus further improving the adhesion between coating 5 and base material 4.

Further, in rotary cutting tool 1 according to the present embodiment, at tip end 7, phase angle θ1 from first cutting edge 11 to second cutting edge 21 in the circumferential direction may be different from phase angle θ2 from second cutting edge 21 to first cutting edge 11 in the circumferential direction. Since first cutting edge 11 and second cutting edge 21 twist in different directions, the axial cutting forces from these cutting edges cancel each other out. First cutting edge 11 and second cutting edge 21 also differ in cutting cycle. Thus, the occurrence of chattering during work is suppressed.

It should be construed that the embodiments disclosed herein are given by way of example in every respect, not by way of limitation. It is intended that the scope of the present invention is defined not by the above-described embodiments but by the terms of claims, and includes any modification within the meaning and scope equivalent to the terms of claims.

REFERENCE SIGNS LIST

1: rotary cutting tool
2: shank
3: main body
4: base material
5: coating
5a: superficial layer
5b: intermediate layer
5c: portion
5d: deep layer
6: base end
7: tip end
11: first cutting edge
12: first bottom edge
13: first rake face
14: first flank face
15: first bottom face
16: first groove
17: third groove
18, 28: straight line
21: second cutting edge
22: second bottom edge
23: second rake face
24: second flank face
25: second bottom face
26: second groove
27: fourth groove
30: workpiece
31: burr
A: rotation axis
B: first circumferential direction
C: second circumferential direction
D1: diameter
D2: core thickness
T: thicknesses

The invention claimed is:

1. A rotary cutting tool comprising:
a main body having a tip end; and
a shank continuous with the main body on a side opposite to the tip end,
the main body being provided with
a first cutting edge having a positive twist angle, and
a second cutting edge having a negative twist angle and separated from the first cutting edge,
each of the first cutting edge and the second cutting edge extending continuously from the tip end to the shank, wherein
the main body includes a base material, and a coating covering the base material,
the coating is a polycrystalline diamond,
the polycrystalline diamond includes a superficial layer and a deep layer, the deep layer is located between the superficial layer and the base material,
a mean grain diameter of the superficial layer is smaller than a mean grain diameter of the deep layer,
the coating includes at least one element selected from the group consisting of iron, molybdenum, and tungsten, and
in a portion of the coating that is in contact with the base material, a total content of the at least one element is not less than $1.0 \times 10^{15}$ atoms/cm$^3$ and not more than $1.0 \times 10^{18}$ atoms/cm$^3$.

2. The rotary cutting tool according to claim 1, wherein a core thickness of the main body is not less than 0.4 times and not more than 0.9 times as large as a diameter of the main body.

3. The rotary cutting tool according to claim 1, wherein the superficial layer having a mean grain diameter of not less than 0.1 μm and not more than 5 μm.

4. The rotary cutting tool according to claim 3, wherein the base material has a surface roughness of not less than 0.2 μm and not more than 2.0 μm.

5. The rotary cutting tool according to claim 1, wherein the base material has a surface roughness of not less than 0.2 μm and not more than 2.0 μm.

6. The rotary cutting tool according to claim 1, wherein, at the tip end, a phase angle from the first cutting edge to the second cutting edge in a circumferential direction is different from a phase angle from the second cutting edge to the first cutting edge in the circumferential direction.

7. The rotary cutting tool according to claim 1, wherein each of the positive twist angle and the negative twist angle has an absolute value of not less than 3° and not more than 10°.

8. The rotary cutting tool according to claim 7, wherein the coating has a thicknesses of not less than 0.2 μm and not more than 2.0 μm.

* * * * *